US008045566B2

(12) United States Patent
Roeder

(10) Patent No.: US 8,045,566 B2
(45) Date of Patent: Oct. 25, 2011

(54) AUTOMATED ROUTER LOAD BALANCING

(75) Inventor: Michael T. Roeder, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2412 days.

(21) Appl. No.: 10/633,444

(22) Filed: Aug. 1, 2003

(65) Prior Publication Data

US 2005/0025051 A1 Feb. 3, 2005

(51) Int. Cl.
*H04L 12/28* (2006.01)
(52) U.S. Cl. ........................................ 370/401; 370/230
(58) Field of Classification Search .......... 370/229–235, 370/400, 401, 402, 403, 404
See application file for complete search history.

(56) References Cited

U.S. PATENT DOCUMENTS

| 5,473,599 | A | * | 12/1995 | Li et al. | 370/219 |
|---|---|---|---|---|---|
| 5,963,540 | A | * | 10/1999 | Bhaskaran | 370/218 |
| 6,209,033 | B1 | | 3/2001 | Datta et al. | |
| 6,295,276 | B1 | * | 9/2001 | Datta et al. | 370/218 |
| 6,470,389 | B1 | * | 10/2002 | Chung et al. | 709/227 |
| 6,493,341 | B1 | * | 12/2002 | Datta et al. | 370/392 |
| 6,580,715 | B1 | | 6/2003 | Bare et al. | |
| 6,754,220 | B1 | * | 6/2004 | Lamberton et al. | 370/401 |
| 6,778,495 | B1 | * | 8/2004 | Blair | 370/230 |
| 6,981,055 | B1 | * | 12/2005 | Ahuja et al. | 709/238 |
| 7,003,581 | B1 | * | 2/2006 | Lamberton et al. | 709/238 |
| 7,010,611 | B1 | * | 3/2006 | Wiryaman et al. | 709/232 |
| 7,099,341 | B2 | * | 8/2006 | Lingafelt et al. | 370/401 |
| 7,102,996 | B1 | * | 9/2006 | Amdahl et al. | 370/230 |
| 7,149,217 | B2 | * | 12/2006 | Alexander et al. | 370/392 |
| 7,269,143 | B2 | * | 9/2007 | Datta et al. | 370/254 |
| 2003/0108052 | A1 | * | 6/2003 | Inoue et al. | 370/399 |
| 2003/0158951 | A1 | * | 8/2003 | Primak et al. | 709/229 |
| 2003/0200333 | A1 | * | 10/2003 | Espieu et al. | 709/240 |
| 2004/0017775 | A1 | * | 1/2004 | Omae et al. | 370/235 |
| 2004/0071087 | A1 | * | 4/2004 | Siev et al. | 370/235 |
| 2004/0215752 | A1 | * | 10/2004 | Satapati et al. | 709/223 |
| 2005/0025179 | A1 | * | 2/2005 | McLaggan et al. | 370/468 |
| 2006/0109853 | A1 | * | 5/2006 | Matsuzawa et al. | 370/400 |

OTHER PUBLICATIONS

S. Deering, ICMP Router Discovery Message, Sep. 1991, pp. 1-15.*
J. Postel, Internet Control Message Protocol, Sep. 1981, pp. 1-20.*

* cited by examiner

*Primary Examiner* — Pao Sinkantarakorn
*Assistant Examiner* — Kan Yuen

(57) ABSTRACT

One embodiment disclosed relates to a method of load balancing between a plurality of routers. A packet is received at a router from a source host to be forward to a destination host. An algorithm is applied at the router to select a gateway for the source host for packets destined to the destination host. An ICMP redirect message is then sent from the router to the source host to reset the gateway of the source host for packets destined to the destination host. An ARP request is received at the plurality of routers from a requesting host from a source IP address in relation to a destination IP address. An algorithm is applied at each router to determine which single router is to respond to the request. The responding router sends an ARP reply to the requesting host.

16 Claims, 3 Drawing Sheets

AUTOMATED ROUTER LOAD BALANCING

BACKGROUND OF THE INVENTION

1. Field of the Invention

The present invention relates generally to networking and communications.

2. Description of the Background Art

Computer networks are widely used to provide increased computing power, sharing of resources and communication between users. Networks may include a number of computer devices within a room, building or site that are connected by a high-speed local data link such as Ethernet, token ring, or the like. Local area networks (LANs) in different locations may be interconnected to form a wide area network (WAN).

In the operation and maintenance of computer networks a number of issues arise, including traffic overload on parts of the network, optimum placement and interconnection of network resources, security, isolation of network faults, and the like. These issues become increasingly complex and difficult to understand and manage as the network becomes larger and more complex.

One particular network management task relates to assigning a gateway to a host on a network. A network administrator may do this task individually per host. Alternatively, or in addition, dynamic host configuration protocol (DHCP) may be used to facilitate this task. A network administrator configures the DHCP server with regards to the gateway to be assigned to the DHCP clients on a network segment.

It is highly desirable to improve technology for networking and communications. In particular, it is desirable to improve technology for assigning a gateway to a host on a network in a way that improves the utilization of network resources.

SUMMARY

One embodiment of the invention pertains to a method of load balancing between a plurality of routers. A packet is received at a router from a source host to be forward to a destination host. An algorithm is applied at the router to select a gateway for the source host for packets destined to the destination host. A message is then sent from the router to the source host to reset the gateway of the source host for packets destined to the destination host.

Another embodiment of the invention pertains to another method of load balancing between a plurality of routers. An ARP request is received at the plurality of routers from a requesting host at a source IP address in relation to a destination IP address. An algorithm is applied at each router to determine which single router is to respond to the request. The responding router sends an ARP reply to the requesting host.

DETAILED DESCRIPTION

Figure 1:
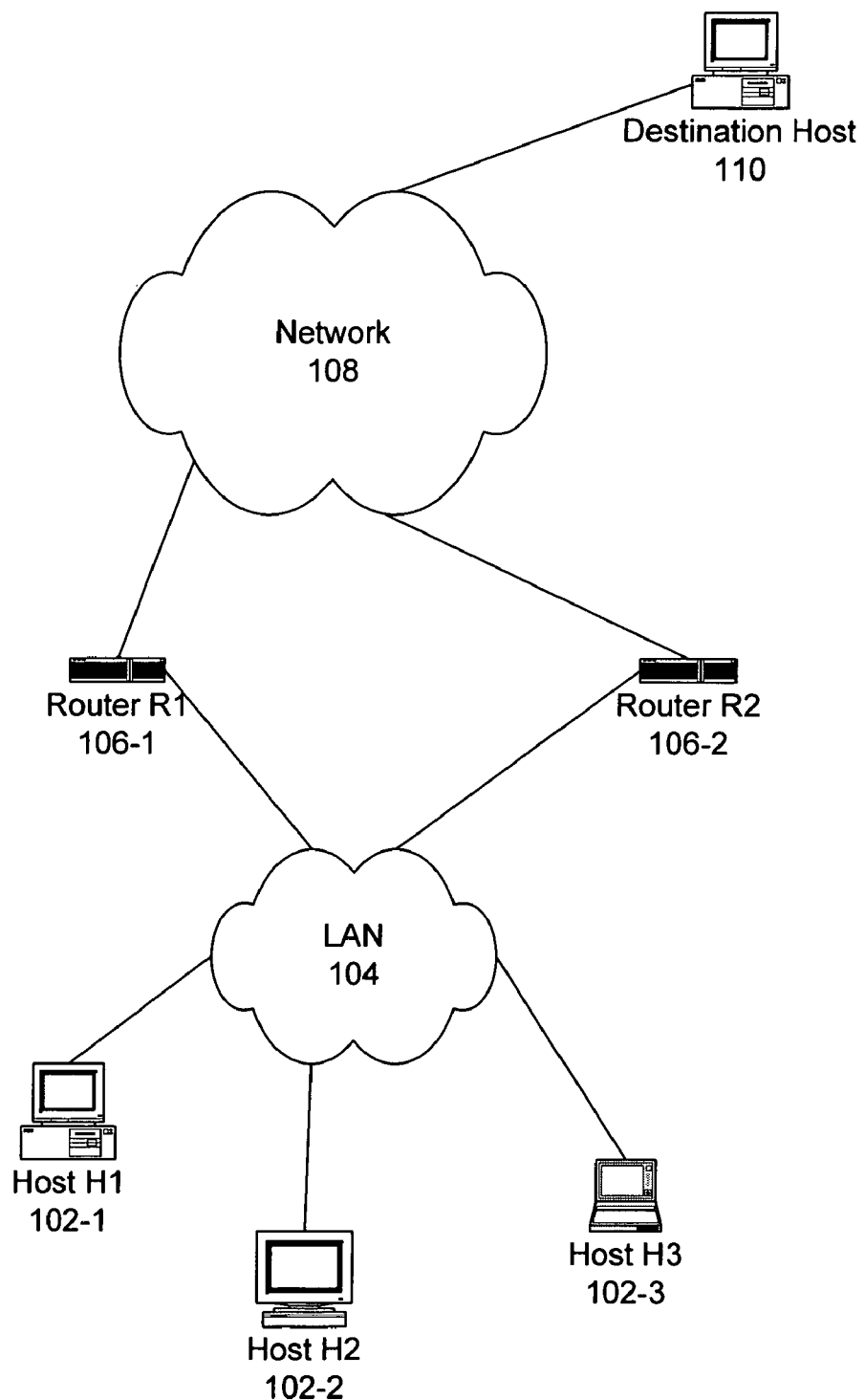
FIG. 1 is a diagram of an example network configuration with more than one router.

Networks may be designed or configured with multiple routers for purposes of redundancy. FIG. 1 is a diagram of an example network configuration with more than one router. The particular example shown in FIG. 1 includes two routers, but embodiments of the present invention also work with more than two routers.

As illustrated in FIG. 1, multiple host devices 102 are communicatively coupled together by way of a local area network (LAN) 104. The host devices 102 may include various computing devices, such as desktop computer, workstation, laptop, and other host device types. The LAN 104 may comprise a form of Ethernet or other local area network type.

Multiple redundant routers 106 are communicatively coupled to the LAN 104. Each router 106 is capable of routing packets from the hosts to various destinations 110 outside the LAN 104 via a network 108. The network 108 may comprise the Internet, or a wide area network, or other network type. Other hosts 110 are communicatively coupled to the network 108. The router 106 may comprise, for example, an internet protocol (IP) router that routes IP packets from a source device to a destination device. The example network configuration of FIG. 1 shows two routers 106-1 and 106-2 between LAN 104 and network 108. Embodiments of the present invention, however, are not limited to network configurations with only two such routers 106. Embodiments of the present invention may operate in other network configurations that include three, four, or more such routers 106.

Normally, host gateway configuration may be performed manually by a network administrator, or dynamically using DHCP. The network administrator may configure each host individually with an assigned gateway, and/or the administrator may configure multiple hosts on a network segment to be assigned to a gateway by using DHCP.

Consider an example where the LAN 104 initially has only one router 106-1 for routing packets to the outside network 108. The hosts 102 on the LAN 104 will be most likely all be configured with a single gateway set to router R1 106-1. Now suppose that the network administrator adds a second router 106-2 for redundancy and greater bandwidth between the LAN 104 and the outside network 108. Normally, load sharing would be accomplished by the network administrator splitting the set of hosts 102 on the LAN 104 between the two routers 106-1 and 106-2. One subset of hosts 102 will be configured with router R1 106-1 as the default gateway, and the other subset of hosts 102 will be configured with router R2 106-2 as the default gateway. If there are N hosts 102 oh the LAN 104, and N is large, then changing half of the hosts' gateway configurations could be very time consuming. Furthermore, this normal technique would only result in static load balancing. It may turn out that one subset of hosts 102 is much more active in sending traffic to the outside network 108 than the other subset of hosts 102. The normal technique would not automatically and dynamically re-configure the hosts' gateways to better balance the load.

Figure 2:
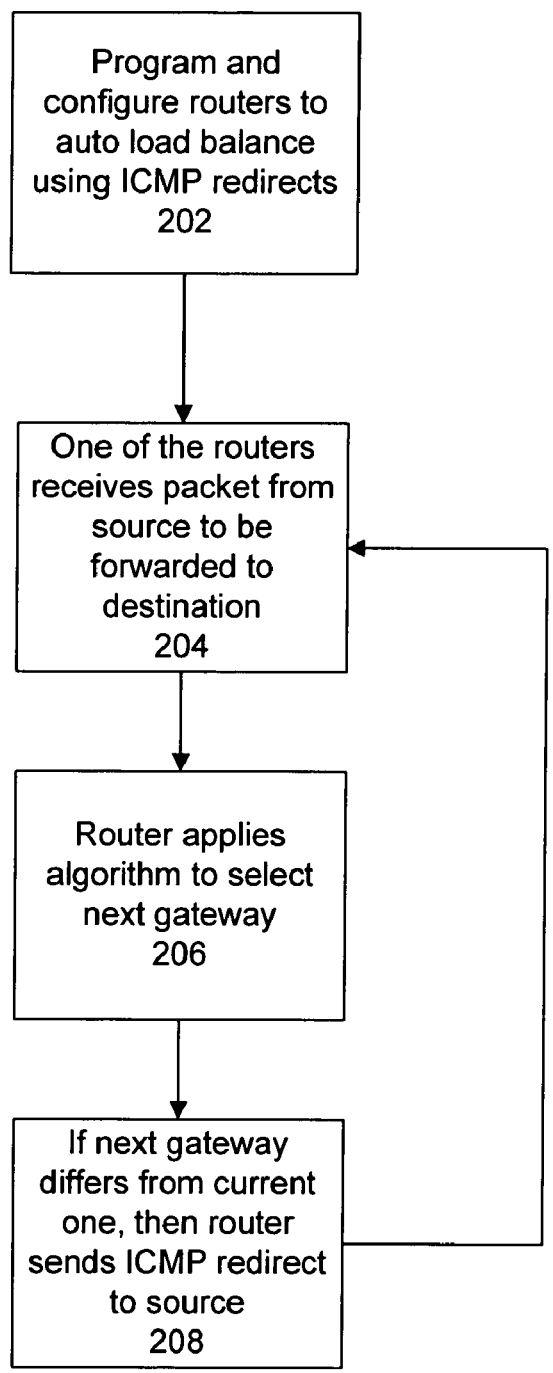
FIG. 2 is a flow chart depicting a method of using ICMP redirects for automated router load balancing in accordance with an embodiment of the invention.

FIG. 2 is a flow chart depicting a method of using ICMP redirects for automated router load balancing in accordance with an embodiment of the invention. This method advantageously performs load balancing between multiple redundant routers without a network administrator manually reconfiguring the default gateways on the hosts.

In a preliminary step, the relevant routers 106 are programmed and configured 202 to automatically load balance between each other. The programming at each relevant router 106 implements the automated process using ICMP redirects that is discussed further below. Each router 106 is also configured to be aware of the other redundant routers 106 that are to share in the load balancing. These routers may be statically configured or they may communicate across the LAN to dynamically adjust for the introduction of new routers or to adjust the load balancing.

The automated process for load balancing between routers begins when one of the redundant routers 106-x receives 204 a packet from a source host 102 for forwarding via the network 108 to a destination host 110. In addition to forwarding the packet, the router 106-x applies 206 a pre-configured algorithm to assign one of the routers 106-y as the next default gateway for that source host 102 for packets destined to the destination host 110.

In one embodiment, the algorithm may comprise a pseudo-random algorithm where the next default gateway for that source host 102 for packets destined to the destination host 110 is chosen at random from amongst the available routers 106. In another embodiment, a round-robin type algorithm may be used to select the next default gateway. In another embodiment, the algorithm may be hashed based, where an output of the has function returns the index of the router to be used to route subsequent packets with the same hash value. For example, the hash function may be a function of any combination of the destination and source IP addresses of the packet. In another embodiment, the algorithm may be load based, taking into account the loads on the various routers 106. For example, the router 106 with the lightest current or recent load may be selected to be the default gateway for that source host 102. Hello packet may be used to communicate the load levels between and amongst the routers 106.

Once the next default gateway is selected, the router 106-x sends 208 an ICMP redirect message to the source host 102. ICMP refers to Internet Control Message Protocol. The ICMP redirect message need only be sent if the next gateway selected differs from the current gateway. In other words, the ICMP redirect may be sent only if it is needed to cause a change in the gateway at the source for packets destined to the destination. ICMP is used by hosts and routers to exchange control information. An ICMP message includes an IP header, an ICMP type field, an ICMP code field, an ICMP checksum, and ICMP message-specific payload data. The ICMP redirect message is configured with an ICMP type field of five (5). The ICMP redirect message is further configured to advise the source host 102 to send its traffic destined to the destination host 110 directly to the router 106-y that was selected by the algorithm to be the next default gateway for that source host 102 for packets destined to the destination host 110.

The process loops back and continues as the routers 106 continue to receive other packets from the various source hosts 102. In one embodiment, each time a router 106 receives 204 a packet from a source host 102, the algorithm is applied 206 and an ICMP redirect is sent 208. In another embodiment the algorithm is applied for every N packets received from a particular source host S to a particular destination host D, in another embodiment the algorithm is applied after a packet has been received, and it has been a period of time T since the last time a packet with this {S,D} pair was received.

Figure 3:
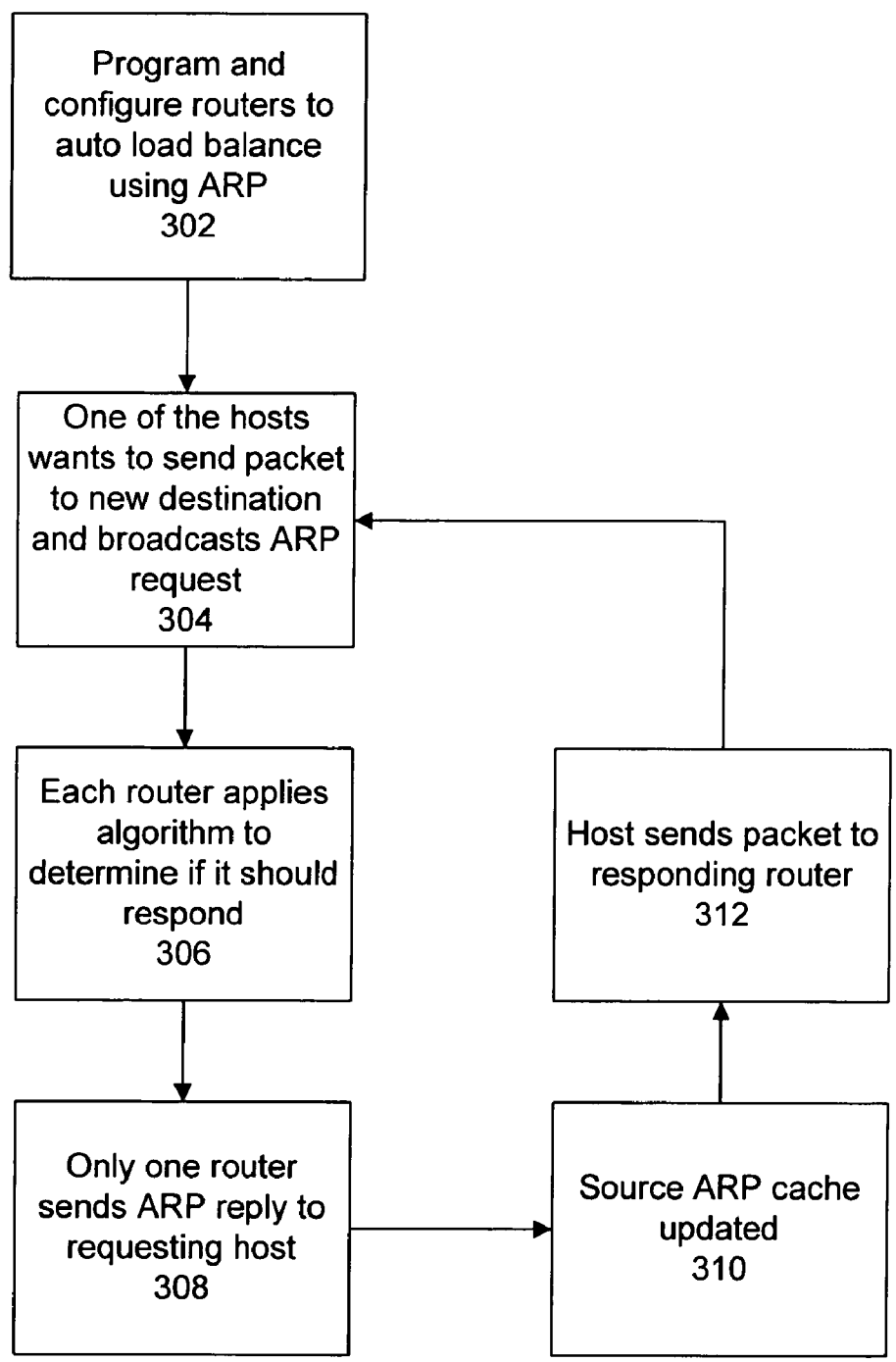
FIG. 3 is a diagram depicting a method using proxy ARP for automated router load balancing in accordance with an embodiment of the invention.

FIG. 3 is a diagram depicting a method using proxy ARP for automated router load balancing in accordance with an embodiment of the invention. This method also advantageously performs load balancing between multiple redundant routers without a network administrator manually reconfiguring the default gateways on the hosts.

In a preliminary step, the relevant routers 106 are programmed and configured 302 to automatically load balance between each other. In this case, the programming at each relevant router 106 implements the automated process using proxy ARP that is discussed further below. Each router 106 is also configured to be aware of the other redundant routers 106 that are to share in the load balancing. This configuration may be done statically, or the routers may become aware of each other through a dynamic protocol. This dynamic protocol could take the form of "hello" packets being periodically transmitted from each node indicating the existence of an auto load balancing router as well as possibly usage statistics about that router.

Here, the automated process for load balancing between routers begins when one of the hosts 102 wants to send a packet to a new external destination 110 and broadcasts 304 an ARP request message to the LAN 104. ARP refers to address resolution protocol. ARP may be used to translate an IP address of a destination host to a physical address. A look-up table (ARP cache) may be used to perform the translation. If the IP address is not found in the ARP cache, an ARP request message may be broadcast to the network. For proxy ARP or transparent subnetting, the destination host does not receive and respond to the broadcast, but a router to that destination does.

In the present process, the multiple redundant routers 106 receive the ARP request, and each router 106 applies an algorithm to determine 306 if it should be the one to respond to the request. The algorithm applied is such that only one router 106-z determines 306 that it should be the one to respond.

In one embodiment, the algorithm may comprise a hash function of the source and destination IP addresses, i.e. a function of the ARP source and target. In the particular case of two routers R1 and R2, an example algorithm may sum together (using XOR) the 32 individual bits of the source address and the 32 individual bits of the target address. If the sum of those 64 bits is an odd number, then R1 is selected, while R2 is selected if the sum is even. In other embodiments, other hash algorithms may be applied. In another embodiment, a round-robin type algorithm may be used to select the responding router 106-z. Such a round-robin type algorithm would include the routers periodically sharing their round robin selection value and the redundant routers would converge on the largest route robin value. This would be done to ensure that no two routers will have different round robin values even if there are periodically ARP requests that are only received by a subset of all of the redundant routers. In another embodiment, the algorithm may be load based, taking into account the loads on the various routers 106. For example, the router 106 with the lightest current or recent load may be selected to respond. Hello packet may be used to communicate the load levels between and amongst the routers 106. The load information could be used to weight a hash function for router selection. This would allow the infrequently used routers to be assigned more hosts without starving the heavily used routers of new hosts. This allows for hysteresis.

The responding router 106-z (and not the other routers) sends 308 an ARP reply message to the requesting host 102. As a result, the ARP cache of the source host will be updated 310 with an entry indicating that the IP address of the new destination translates to the MAC (media access) address of the responding router 106-z. In addition, the requesting host 102 sends 312 the packet to the responding router 106-z.

The process loops back and continues as other ARP requests are broadcast 304 from hosts 102 wanting to send out packets. Each time such an ARP request is broadcast 304, the routers 106 apply 306 the algorithm, a single router sends 308 an ARP reply, the requesting host sends 310 the packet to that router (and probably all subsequent packets to that same destination until the ARP entry for that destination is aged out of the host ARP cache), and the ARP cache may be updated 312 accordingly.

Advantageously, embodiments of the present invention enable a network administrator to more simply and easily load balance between multiple routers. In addition, the load balancing is performed in a dynamic manner that adjusts itself over time, unlike a static load balancing.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of load balancing between a plurality of routers by automated resetting of gateways, the method comprising:
    receiving a packet at a first router from a source host to be forwarded to a destination host;
    identifying a current load on the first router;
    determining whether the packet is to be routed by another one of the plurality of routers based upon the identified current load of the first router;
    applying an algorithm at the first router to select a second router from the plurality of routers to be a next gateway for the source host for packets destined to the destination host in response to a determination that the packet is to be routed by another one of the plurality of routers; and
    sending an ICMP redirect message from the first router to the source host to reset a default gateway of the source host to be the second router for packets destined to the destination host.

2. The method of claim 1, wherein the algorithm comprises a pseudo-random algorithm.

3. The method of claim 1, wherein the algorithm selects the next default gateway using a round robin type selection process.

4. The method of claim 1, wherein the algorithm comprises a hash function, wherein an output of the hash function returns an index of a router to be used to route subsequent packets with a same hash value.

5. The method of claim 4, wherein the hash function is a function of any combination of the IP addresses of the destination and source hosts of the packet.

6. The method of claim 1, wherein the algorithm is load based, and further comprising communicating load levels amongst the plurality of routers.

7. An apparatus for routing packets with a load balancing capability involving automated resetting of gateways, the apparatus comprising:
    a first router configured to receive a packet from a source host to be routed to a destination host;
    a selection module configured to identify a current load on the first router, determine whether the packet is to be routed by another one of the plurality of routers based upon the identified current load of the first router, apply an algorithm to select a second router from the plurality of routers to be a next gateway of the source host for packets destined to the destination host; and
    a transmission module configured to send an ICMP redirect message to the source host to reset a current gateway of the source host to be said second router for packets destined to the destination host.

8. The apparatus of claim 7, wherein the selection module comprises a pseudo-random number generator.

9. The apparatus of claim 7, wherein the selection module applies a round-robin type algorithm to select the next gateway.

10. The apparatus of claim 7, wherein the selection module applies a hash function.

11. The apparatus of claim 10, wherein the hash function is a function of a source IP address.

12. The apparatus of claim 10, wherein the hash function is a function of a combination of the source and destination IP addresses.

13. The apparatus of claim 7, wherein the apparatus is configured to communicate load levels to and receive load levels from other routing apparatus, and wherein the selection module applies a load-based algorithm.

14. The apparatus of claim 13, wherein the load-based algorithm comprises a weighted hash algorithm.

15. The apparatus of claim 13, wherein the load-based algorithm comprises a weighted round robin algorithm.

16. The apparatus of claim 13, wherein the load-based algorithm comprises a pseudo-random algorithm.

\* \* \* \* \*